United States Patent
Foster et al.

(10) Patent No.: US 10,749,739 B2
(45) Date of Patent: Aug. 18, 2020

(54) DISTRIBUTED 802.11S MESH NETWORK USING TRANSFORMER MODULE HARDWARE FOR THE CAPTURE AND TRANSMISSION OF DATA

(71) Applicant: DELTA ENERGY & COMMUNICATIONS, INC., Murrieta, CA (US)

(72) Inventors: Scott Foster, Murrieta, CA (US); Angelo Borrelli, Fairhope, AL (US); Keith Teichmann, Newton Centre, MA (US); Mike Ratliff, Denver, CO (US)

(73) Assignee: DELTA ENERGY & COMMUNICATIONS, INC., Murrieta, CA (US)

( * ) Notice: Subject to any disclaimer, the term of this patent is extended or adjusted under 35 U.S.C. 154(b) by 0 days.

(21) Appl. No.: 15/442,244

(22) Filed: Feb. 24, 2017

(65) Prior Publication Data
US 2017/0302511 A1    Oct. 19, 2017

Related U.S. Application Data

(60) Provisional application No. 62/299,348, filed on Feb. 24, 2016.

(51) Int. Cl.
*H04L 29/06* (2006.01)
*H04L 12/24* (2006.01)
(Continued)

(52) U.S. Cl.
CPC ...... *H04L 41/0803* (2013.01); *H02J 13/0075* (2013.01); *H04L 41/12* (2013.01);
(Continued)

(58) Field of Classification Search
CPC .. H04L 41/0803; H04L 41/02; H02J 13/0075; Y04S 10/30; Y02E 60/74
See application file for complete search history.

(56) References Cited

U.S. PATENT DOCUMENTS

| | | | |
|---|---|---|---|
| 2,704,809 A | 3/1955 | Williams | |
| 4,724,381 A | 2/1988 | Crimmins | |

(Continued)

FOREIGN PATENT DOCUMENTS

| | | |
|---|---|---|
| CN | 101860978 | 10/2010 |
| CN | 102255869 | 11/2011 |

(Continued)

OTHER PUBLICATIONS

International Search Report and Written Opinion, International Application No. PCT/US2017/46991, dated Nov. 21, 2017 (8 pages).

(Continued)

*Primary Examiner* — Faruk Hamza
*Assistant Examiner* — Abusayeed M Haque
(74) *Attorney, Agent, or Firm* — Ware, Fressola, Maguire & Barber LLP

(57) ABSTRACT

A power grid network is provided featuring a mesh network having a mesh node with a signal processor. The signal processor receives signaling containing information about collected data, which includes electrical signaling data related to electrical signaling being processed by a transformer to which the mesh node is coupled, metered data related to associated electrical signaling being provided from the transformer to a building or structure, and other mesh network data from one or more other mesh nodes deployed in the mesh network. The signal processor also determines corresponding signaling containing information about the collected data for transmitting back to a central location or one or more corresponding mesh nodes in the (Continued)

mesh network for further processing, based upon the signaling received.

36 Claims, 5 Drawing Sheets

(51) Int. Cl.
  *H04L 5/14* (2006.01)
  *H02J 13/00* (2006.01)
  *H04W 84/18* (2009.01)

(52) U.S. Cl.
  CPC .......... *H04W 84/18* (2013.01); *Y02B 90/2653* (2013.01); *Y02E 60/74* (2013.01); *Y04S 10/30* (2013.01); *Y04S 40/126* (2013.01)

(56) References Cited

U.S. PATENT DOCUMENTS

| | | | |
|---|---|---|---|
| 5,426,360 | A | 6/1995 | Maraio et al. |
| 5,748,104 | A | 5/1998 | Argyroudis et al. |
| 5,940,009 | A | 8/1999 | Loy et al. |
| 6,018,449 | A | 1/2000 | Nelson et al. |
| 6,211,764 | B1 | 4/2001 | Schweitzer, Jr. |
| 6,300,881 | B1 | 10/2001 | Yee et al. |
| 6,549,120 | B1 | 4/2003 | de Buda |
| 6,711,512 | B2 | 3/2004 | Noh |
| 6,829,491 | B1 | 12/2004 | Yea et al. |
| 6,856,256 | B2 | 2/2005 | Winkler |
| 6,880,086 | B2 | 4/2005 | Kidder et al. |
| 6,906,630 | B2 | 6/2005 | Georges et al. |
| 6,998,962 | B2 | 2/2006 | Cope et al. |
| 7,049,976 | B2 | 5/2006 | Hunt et al. |
| 7,054,770 | B2 | 5/2006 | Swarztrauber et al. |
| 7,058,524 | B2 | 6/2006 | Hayes et al. |
| 7,107,329 | B1 | 9/2006 | Schroder et al. |
| 7,126,558 | B1 | 10/2006 | Dempski |
| 7,271,735 | B2 | 9/2007 | Rogai |
| 7,304,587 | B2 | 12/2007 | Boaz |
| 7,310,052 | B2 | 12/2007 | Bowman |
| 7,379,981 | B2 | 5/2008 | Elliott et al. |
| 7,402,993 | B2 | 7/2008 | Morrison |
| 7,440,436 | B2 | 10/2008 | Cheng et al. |
| 7,496,078 | B2 | 2/2009 | Rahman |
| 7,733,839 | B1 | 6/2010 | Frank et al. |
| 7,747,534 | B2 | 6/2010 | Villicana et al. |
| 7,764,943 | B2 | 7/2010 | Radtke |
| 7,894,371 | B2 | 2/2011 | Bonta et al. |
| 7,936,163 | B2 | 5/2011 | Lee, Jr. |
| 7,940,039 | B2 | 5/2011 | de Buda |
| 7,961,740 | B2 | 6/2011 | Flammer, III et al. |
| 8,054,199 | B2 | 11/2011 | Addy |
| 8,060,259 | B2 | 11/2011 | Budhraja et al. |
| 8,102,148 | B2 | 1/2012 | Hershey et al. |
| 8,121,741 | B2 | 2/2012 | Taft et al. |
| 8,145,732 | B2 | 3/2012 | Kumar et al. |
| 8,194,275 | B2 | 6/2012 | Furst et al. |
| 8,279,870 | B2 | 10/2012 | Flammer, III et al. |
| 8,305,932 | B2 | 11/2012 | Qiu et al. |
| 8,311,863 | B1 | 11/2012 | Kemp |
| 8,370,697 | B2 | 2/2013 | Veillette |
| 8,373,575 | B2 | 2/2013 | Boettner et al. |
| 8,385,978 | B2 | 2/2013 | Leung et al. |
| 8,401,709 | B2 | 3/2013 | Cherian et al. |
| 8,412,735 | B2 | 4/2013 | Yeh et al. |
| 8,423,637 | B2 | 4/2013 | Vaswani et al. |
| 8,428,021 | B2 | 4/2013 | Karunakaran et al. |
| 8,437,883 | B2 | 5/2013 | Powell et al. |
| 8,441,372 | B2 | 5/2013 | Smith et al. |
| 8,452,555 | B2 | 5/2013 | Swarztrauber et al. |
| 8,509,953 | B2 | 8/2013 | Taft |
| 8,543,250 | B2 | 9/2013 | Seo et al. |
| 8,553,561 | B1 | 10/2013 | Chokshi et al. |
| 8,566,046 | B2 | 10/2013 | Deaver, Sr. |
| 8,583,520 | B1 | 11/2013 | Forbes, Jr. |
| 8,600,572 | B2 | 12/2013 | Sri-Jayantha |
| 8,660,868 | B2 | 2/2014 | Vogel et al. |
| 8,755,303 | B2 | 6/2014 | Hughes et al. |
| 8,792,626 | B2 | 7/2014 | Cook et al. |
| 8,847,826 | B2 | 9/2014 | Rao et al. |
| 8,855,102 | B2 | 10/2014 | Borleske et al. |
| 8,862,281 | B2 | 10/2014 | Yoneda et al. |
| 8,874,477 | B2 | 10/2014 | Hoffberg |
| 8,880,234 | B2 | 11/2014 | Sekoguchi et al. |
| 8,909,358 | B2 | 12/2014 | Karnouskos |
| 8,917,716 | B2 | 12/2014 | Tran |
| 8,937,497 | B1 | 1/2015 | Tobin |
| 8,959,114 | B2 | 2/2015 | Rehman |
| 8,963,807 | B1 | 2/2015 | Lee et al. |
| 8,964,757 | B2 * | 2/2015 | Watson ............... H04L 47/14 370/395.21 |
| 8,965,590 | B2 | 2/2015 | Boardman et al. |
| 8,970,394 | B2 | 3/2015 | Veillette |
| 9,002,670 | B2 | 4/2015 | Hurri et al. |
| 9,013,173 | B2 | 4/2015 | Veillette |
| 9,014,996 | B2 | 4/2015 | Kamel et al. |
| 9,031,116 | B2 | 5/2015 | Young et al. |
| 9,043,174 | B2 | 5/2015 | Arya et al. |
| 9,052,216 | B2 | 6/2015 | Kamel et al. |
| 9,087,451 | B1 | 7/2015 | Jarrell |
| 9,110,101 | B2 | 8/2015 | Pietrowicz et al. |
| 9,112,381 | B2 | 8/2015 | Carralero et al. |
| 9,118,219 | B2 | 8/2015 | Booth |
| 9,129,355 | B1 | 9/2015 | Harvey et al. |
| 9,141,653 | B2 | 9/2015 | Zhou et al. |
| 9,144,082 | B2 | 9/2015 | Rubin et al. |
| 9,162,753 | B1 | 10/2015 | Panto et al. |
| 9,400,192 | B1 | 7/2016 | Salser, Jr. et al. |
| 9,400,867 | B2 | 7/2016 | Boyd et al. |
| 9,402,292 | B1 | 7/2016 | Gordin et al. |
| 9,451,060 | B1 * | 9/2016 | Bowers ............... H04W 12/06 |
| 9,500,716 | B2 | 11/2016 | Turner et al. |
| 9,654,173 | B2 | 5/2017 | Barzegar et al. |
| 9,961,572 | B2 | 5/2018 | Foster et al. |
| 10,055,869 | B2 | 8/2018 | Borrelli et al. |
| 10,055,966 | B2 | 8/2018 | Foster et al. |
| 2001/0038342 | A1 | 11/2001 | Foote |
| 2002/0046368 | A1 | 4/2002 | Friedrich et al. |
| 2002/0064010 | A1 | 5/2002 | Nelson et al. |
| 2003/0050737 | A1 | 3/2003 | Osann, Jr. |
| 2003/0078996 | A1 | 4/2003 | Baldwin |
| 2003/0128149 | A1 | 7/2003 | Miceli et al. |
| 2004/0057491 | A1 | 3/2004 | Stenestam |
| 2004/0082203 | A1 | 4/2004 | Logvinov et al. |
| 2005/0078624 | A1 | 4/2005 | Shu et al. |
| 2005/0088299 | A1 | 4/2005 | Bandy et al. |
| 2006/0007016 | A1 | 1/2006 | Borkowski et al. |
| 2006/0056363 | A1 | 3/2006 | Ratiu et al. |
| 2006/0141940 | A1 | 6/2006 | Bloom et al. |
| 2006/0145834 | A1 | 7/2006 | Berkman et al. |
| 2007/0043849 | A1 | 2/2007 | Lill et al. |
| 2007/0048702 | A1 | 3/2007 | Jang et al. |
| 2007/0088630 | A1 | 4/2007 | MacLeod et al. |
| 2007/0229295 | A1 | 10/2007 | Curt et al. |
| 2008/0065342 | A1 | 3/2008 | Zalitzky et al. |
| 2008/0100436 | A1 | 5/2008 | Banting et al. |
| 2008/0106425 | A1 | 5/2008 | Deaver et al. |
| 2008/0109387 | A1 | 5/2008 | Deaver et al. |
| 2008/0272934 | A1 * | 11/2008 | Wang ............... H02J 13/0075 340/870.11 |
| 2008/0317047 | A1 | 12/2008 | Zeng et al. |
| 2009/0003662 | A1 | 1/2009 | Joseph et al. |
| 2009/0088907 | A1 | 4/2009 | Lewis et al. |
| 2009/0102680 | A1 | 4/2009 | Roos |
| 2009/0111456 | A1 | 4/2009 | Shaffer et al. |
| 2009/0119068 | A1 | 5/2009 | Banting |
| 2009/0146839 | A1 | 6/2009 | Reddy et al. |
| 2009/0167558 | A1 | 7/2009 | Borleske et al. |
| 2009/0187284 | A1 * | 7/2009 | Kreiss ............... H02J 3/14 700/291 |
| 2009/0240449 | A1 | 9/2009 | Gibala et al. |
| 2009/0256686 | A1 | 10/2009 | Abbot et al. |
| 2009/0267792 | A1 | 10/2009 | Crichlow |
| 2010/0074176 | A1 | 3/2010 | Flammer, III et al. |

(56) References Cited

U.S. PATENT DOCUMENTS

| | | |
|---|---|---|
| 2010/0278187 A1 | 11/2010 | Hart et al. |
| 2010/0313146 A1 | 12/2010 | Nielsen et al. |
| 2011/0026500 A1 | 2/2011 | Shaffer et al. |
| 2011/0047230 A1 | 2/2011 | McGee |
| 2011/0090833 A1 | 4/2011 | Kneckt et al. |
| 2011/0095867 A1* | 4/2011 | Ahmad ................. G01D 4/004 340/10.1 |
| 2011/0208367 A1 | 8/2011 | Sackman et al. |
| 2011/0255417 A1* | 10/2011 | Mohan .................. H04L 63/00 370/241.1 |
| 2012/0007885 A1 | 1/2012 | Huston |
| 2012/0029897 A1 | 2/2012 | Cherian et al. |
| 2012/0050971 A1 | 3/2012 | Seal et al. |
| 2012/0058790 A1 | 3/2012 | Junnell et al. |
| 2012/0059609 A1 | 3/2012 | Oh et al. |
| 2012/0078686 A1 | 3/2012 | Bashani |
| 2012/0089268 A1 | 4/2012 | Torre et al. |
| 2012/0092114 A1 | 4/2012 | Matthews |
| 2012/0106394 A1 | 5/2012 | Apostolakis |
| 2012/0126790 A1 | 5/2012 | Sobotka et al. |
| 2012/0126994 A1 | 5/2012 | Sobotka et al. |
| 2012/0131324 A1 | 5/2012 | Ansari et al. |
| 2012/0229089 A1 | 9/2012 | Bemmel et al. |
| 2012/0229296 A1 | 9/2012 | Ree |
| 2012/0230237 A1 | 9/2012 | Gong et al. |
| 2012/0242698 A1 | 9/2012 | Haddick et al. |
| 2012/0249741 A1 | 10/2012 | Maciocci et al. |
| 2012/0253881 A1 | 10/2012 | Schneider et al. |
| 2012/0265355 A1 | 10/2012 | Bernheim et al. |
| 2012/0277926 A1 | 11/2012 | Nielsen et al. |
| 2012/0286770 A1* | 11/2012 | Schroder ................ H05B 47/19 324/113 |
| 2012/0303746 A1 | 11/2012 | Yu et al. |
| 2012/0316688 A1 | 12/2012 | Boardman et al. |
| 2012/0316696 A1 | 12/2012 | Boardman et al. |
| 2013/0026986 A1 | 1/2013 | Parthasarathy et al. |
| 2013/0035802 A1 | 2/2013 | Khaitan et al. |
| 2013/0069985 A1 | 3/2013 | Wong et al. |
| 2013/0077610 A1 | 3/2013 | Amini et al. |
| 2013/0103660 A1 | 4/2013 | Welsh et al. |
| 2013/0106617 A1 | 5/2013 | Heo et al. |
| 2013/0110837 A1 | 5/2013 | Dai et al. |
| 2013/0123998 A1 | 5/2013 | King et al. |
| 2013/0190939 A1 | 7/2013 | Lenox |
| 2013/0203378 A1* | 8/2013 | Vos .......................... H04W 4/24 455/406 |
| 2013/0218495 A1 | 8/2013 | Boone et al. |
| 2013/0222215 A1 | 8/2013 | Kobayashi |
| 2013/0223334 A1 | 8/2013 | Guo et al. |
| 2013/0278437 A1 | 10/2013 | Wyk |
| 2013/0278631 A1 | 10/2013 | Border et al. |
| 2013/0289782 A1 | 10/2013 | Giroti |
| 2013/0297087 A1 | 11/2013 | Koster et al. |
| 2013/0297239 A1 | 11/2013 | Arya et al. |
| 2013/0297868 A1 | 11/2013 | Yin et al. |
| 2013/0304264 A1 | 11/2013 | Shao |
| 2013/0335062 A1 | 12/2013 | de Buda et al. |
| 2014/0067330 A1 | 3/2014 | Flammer, III |
| 2014/0092765 A1* | 4/2014 | Agarwal ................ H04W 24/02 370/252 |
| 2014/0098685 A1* | 4/2014 | Shattil .................. H04L 67/1014 370/252 |
| 2014/0129160 A1 | 5/2014 | Tran |
| 2014/0167977 A1 | 6/2014 | Bean et al. |
| 2014/0172133 A1 | 6/2014 | Snyder |
| 2014/0183964 A1 | 7/2014 | Walley |
| 2014/0233620 A1 | 8/2014 | Bernheim et al. |
| 2014/0237525 A1 | 8/2014 | Rothschild et al. |
| 2014/0241354 A1 | 8/2014 | Shuman et al. |
| 2014/0244017 A1 | 8/2014 | Freiwirth et al. |
| 2014/0244768 A1 | 8/2014 | Shuman et al. |
| 2014/0244833 A1 | 8/2014 | Sharma et al. |
| 2014/0259108 A1 | 9/2014 | Clark et al. |
| 2014/0267400 A1 | 9/2014 | Mabbutt et al. |
| 2014/0270749 A1 | 9/2014 | Miniscalo et al. |
| 2014/0277813 A1 | 9/2014 | Powell et al. |
| 2014/0279694 A1 | 9/2014 | Gauger et al. |
| 2014/0289004 A1 | 9/2014 | Monforte et al. |
| 2014/0297206 A1 | 10/2014 | Silverman |
| 2014/0300210 A1* | 10/2014 | Abi-Ackel ............. G01R 21/00 307/130 |
| 2014/0300344 A1 | 10/2014 | Turner et al. |
| 2014/0306525 A1 | 10/2014 | Greer et al. |
| 2014/0312802 A1 | 10/2014 | Recker et al. |
| 2014/0320306 A1 | 10/2014 | Winter |
| 2014/0334073 A1 | 11/2014 | Thompson et al. |
| 2014/0358315 A1 | 12/2014 | Liu et al. |
| 2014/0361907 A1 | 12/2014 | Bernheim et al. |
| 2014/0368189 A1 | 12/2014 | Bernheim et al. |
| 2014/0371941 A1 | 12/2014 | Keller et al. |
| 2014/0372583 A1 | 12/2014 | Tseng |
| 2014/0376405 A1 | 12/2014 | Erickson et al. |
| 2014/0376914 A1 | 12/2014 | Miniscalo |
| 2014/0380488 A1 | 12/2014 | Datta Ray et al. |
| 2015/0002186 A1 | 1/2015 | Taft |
| 2015/0019342 A1 | 1/2015 | Gupta |
| 2015/0019553 A1 | 1/2015 | Shaashua et al. |
| 2015/0058445 A1 | 2/2015 | Choi et al. |
| 2015/0063202 A1 | 3/2015 | Mazzarella et al. |
| 2015/0066772 A1 | 3/2015 | Griffin et al. |
| 2015/0094874 A1 | 4/2015 | Hall et al. |
| 2015/0094968 A1 | 4/2015 | Jia et al. |
| 2015/0095936 A1 | 4/2015 | Yu et al. |
| 2015/0112469 A1 | 4/2015 | Da Silva Neto et al. |
| 2015/0121470 A1 | 4/2015 | Rongo et al. |
| 2015/0127601 A1 | 5/2015 | McGill et al. |
| 2015/0142963 A1 | 5/2015 | Choi et al. |
| 2015/0148979 A1 | 5/2015 | Forbes, Jr. |
| 2015/0149396 A1 | 5/2015 | Arya et al. |
| 2015/0155713 A1 | 6/2015 | Forbes, Jr. |
| 2015/0163849 A1 | 6/2015 | Bauer et al. |
| 2015/0179062 A1 | 6/2015 | Ralston et al. |
| 2015/0200713 A1 | 7/2015 | Hui et al. |
| 2015/0200846 A1 | 7/2015 | Hui et al. |
| 2015/0220762 A1 | 8/2015 | Jiang et al. |
| 2015/0249595 A1* | 9/2015 | Geiger .................... H04L 45/24 370/392 |
| 2015/0256433 A1 | 9/2015 | Sum et al. |
| 2015/0256435 A1 | 9/2015 | Sum et al. |
| 2015/0276433 A1 | 10/2015 | Brahmajosyula et al. |
| 2015/0281996 A1 | 10/2015 | Rubin et al. |
| 2015/0288532 A1 | 10/2015 | Veyseh et al. |
| 2015/0288825 A1 | 10/2015 | Cook |
| 2015/0294557 A1 | 10/2015 | Willig et al. |
| 2015/0311951 A1 | 10/2015 | Hariz |
| 2015/0370615 A1 | 12/2015 | Pi-Sunyer |
| 2015/0373521 A1* | 12/2015 | Olesen .................... H04W 4/029 455/404.2 |
| 2015/0373641 A1* | 12/2015 | Yamana ............ H04W 52/0206 370/328 |
| 2016/0029384 A1 | 1/2016 | Sidhu et al. |
| 2016/0081127 A1 | 3/2016 | Lee et al. |
| 2016/0094402 A1 | 3/2016 | Finkelstein |
| 2016/0134932 A1 | 5/2016 | Karp et al. |
| 2016/0205106 A1 | 7/2016 | Yacoub et al. |
| 2016/0214715 A1 | 7/2016 | Meffert |
| 2016/0261425 A1 | 9/2016 | Horton et al. |
| 2016/0292205 A1* | 10/2016 | Massey ............. G06Q 10/0637 |
| 2016/0327603 A1 | 11/2016 | Sonderegger et al. |
| 2016/0360361 A1 | 12/2016 | Ross et al. |
| 2016/0366461 A1 | 12/2016 | Hu et al. |
| 2017/0003142 A1 | 1/2017 | Allcorn et al. |
| 2017/0048598 A1 | 2/2017 | Foster et al. |
| 2017/0108236 A1 | 4/2017 | Guan et al. |
| 2017/0134092 A1 | 5/2017 | Foster et al. |
| 2017/0223807 A1 | 8/2017 | Recker et al. |
| 2017/0237612 A1 | 8/2017 | Foster et al. |
| 2017/0339536 A1 | 11/2017 | Lewis et al. |
| 2018/0132015 A1 | 5/2018 | Borrelli et al. |

(56) References Cited

U.S. PATENT DOCUMENTS

| | | |
|---|---|---|
| 2018/0267494 A1 | 9/2018 | Meranda et al. |
| 2018/0366978 A1 | 12/2018 | Matan et al. |

FOREIGN PATENT DOCUMENTS

| | | |
|---|---|---|
| CN | 102355682 | 2/2012 |
| CN | 102412530 | 4/2012 |
| CN | 102508989 | 6/2012 |
| CN | 202513670 | 10/2012 |
| CN | 103078673 | 5/2013 |
| CN | 103209385 | 7/2013 |
| CN | 103313437 | 9/2013 |
| CN | 103488988 | 1/2014 |
| CN | 103810753 | 5/2014 |
| CN | 203965904 | 11/2014 |
| CN | 104238730 | 12/2014 |
| CN | 104333733 | 2/2015 |
| CN | 204142366 | 2/2015 |
| CN | 204203734 | 3/2015 |
| CN | 104485746 | 4/2015 |
| CN | 104581087 | 4/2015 |
| CN | 204465736 | 7/2015 |
| CN | 204595654 | 8/2015 |
| EP | 2296069 | 3/2011 |
| EP | 2818878 | 12/2014 |
| EP | 2721772 | 10/2015 |
| KR | 20130108769 A | 10/2013 |
| WO | 2009059386 | 5/2009 |
| WO | 2010003452 | 1/2010 |
| WO | 2011079358 | 7/2011 |
| WO | 2012047089 | 4/2012 |
| WO | 2012122454 | 9/2012 |
| WO | 2012142586 | 10/2012 |
| WO | 2012154938 | 11/2012 |
| WO | 2012155126 | 11/2012 |
| WO | 2013019595 | 2/2013 |
| WO | 2013028407 | 2/2013 |
| WO | 2013123445 | 8/2013 |
| WO | 2013173230 | 11/2013 |
| WO | 2014056558 | 4/2014 |
| WO | 2014091434 | 6/2014 |
| WO | 2014118622 | 8/2014 |
| WO | 2014123737 | 8/2014 |
| WO | 2014124318 | 8/2014 |
| WO | 2014130568 | 8/2014 |
| WO | 2014169018 | 10/2014 |
| WO | 2014175721 | 10/2014 |
| WO | 2015032164 | 3/2015 |
| WO | 2015046695 | 4/2015 |
| WO | 2015073687 | 5/2015 |
| WO | 2015105658 | 7/2015 |
| WO | 2015123623 | 8/2015 |
| WO | 2015131462 | 9/2015 |
| WO | 2015138447 | 9/2015 |
| WO | 2015161083 | 10/2015 |

OTHER PUBLICATIONS

Detlef Zuehlke, "SmartFactory—Towards a factory-of-things." Annual Reviews in Control, 34.1, Mar. 28, 2010, pp. 129-138.

Artem Katasonov, et al., "Smart Semantic Middleware for the Internet of Things", Jan. 2008, 11 pages.

Andrea Zanella, et al., "Internet of Things for Smart Cities." IEEE Internet of Things Journal, vol. 1, Iss. 1, Feb. 2014, pp. 22-32.

Dieter Uckelmann, et al., "An Architectural Approach Towards the Future Internet of Things." Architecting The Internet of Things, Springer-Verlag Berlin Heidelberg, 2011, pp. 1-24.

Ning Zhong, et al., "Research challenges and perspectives on Wisdom Web of Things (W2T)." The Journal of Supercomputing, Nov. 26, 2010, 21 pages.

Devidas, A. R. and Ramesh, M. V., "Wireless Smart Grid Design for Monitoring and Optimizing Electric Transmission in India," 2010 Fourth International Conference on Sensor Technologies and Applications, Jul. 18-25, 2010, Venice, IEEE, pp. 637-640 (2 pages).

Erol-Kantarci, M. and Mouftah, H. T., "Wireless Multimedia Sensor and Actor Networks for the Next Generation Power Grid," Ad Hoc Networks, vol. 9, Issue 4, Jun. 2011, pp. 542-551 (2 pages).

Gungor, V. C., Lu, B. and Hancke, G. P., "Opportunities and Challenges of Wireless Sensor Networks in Smart Grid," IEEE Transactions on Industrial Electronics, vol. 57, No. 10, Oct. 2010, pp. 3557-3564.

Nasipuri, A. et al., "Demo Abstract: Wireless Sensor Network for Substation Monitoring: Design and Deployment," ResearchGate Conference Paper, Jan. 2008 (3 pages).

St. John, Jeff, "How Utilities Could Use Virtual Reality and Google Glass to Monitor the Grid," Mar. 3, 2015, 6 pages.

InfoBright, "Internet of Things Part 8: Smart Grids—the Future of Energy Delivery," 2014, 2 pages, https://www.infobright.com/index.php/internet-of-things-part-8-smart-grids-future-energy-delivery/#.VdHztvIVhBd.

Monnier, Olivier, "A Smarter Grid With the Internet of Things," Texas Instruments, Oct. 2013, 11 pages.

Lockheed Martin, "Self-Powered Ad-hoc Network", http://www.lockheedmartin.com/us/products/span.html, accessed Nov. 9, 2015.

Owada, et al., "Design for Disaster-Tolerant and Dependable Network Architecture," ICMU 2012, pp. 136-141, Information Processing Society of Japan, 2012.

Morganthaler, et al., "UAVNet: A Mobile Wireless Mesh Network Using Unmanned Aerial Vehicles," available at http://rvs.unibe.ch/research/pub_files/MBZSA12.pdf, 2012.

Snow, "Why Drones Are the Future of the Internet of Things", Dec. 1, 2014, available at https://www.suasnews.com/2014/12/why-drones-are-the-future-of-the-internet-of-things/.

Jiang, R. et al., "Energy-theft detection issues for advanced metering infrastructure in smart grid," IEEE, Tsinghua Science and Technology, vol. 19, Issue 2, Apr. 15, 2014 (16 pages).

Blumsack, S. et al., Abstract of "Ready or not, here comes the smart grid!" Energy, vol. 37, Issue 1, Jan. 2012 (pp. 61-68).

McLaughlin, S. et al., "Energy theft in the advanced metering infrastructure," Abstract, Critical Information Infrastructures Security, Sep. 30, 2009 (pp. 176-187).

Amin, R. et al., "Roadmap to Smart Grid Technology: A Review of Smart Information and Communication System," International Journal of Control and Automation, vol. 7, No. 8, 2014, pp. 407-418.

Elyengui, S. et al., "The Enhancement of Communication Technologies and Networks for Smart Grid Applications," International Journal of Emerging Trends & Technology in Computer Science, vol. 2, issue 6, Nov. 2013, pp. 107-115.

Qin, Z., "A Survey of Networking Issues in Smart Grid," www.cse.wustl.edu/~jain/cse570-13/ftp/smrtgrid/index.html, Dec. 20, 2013 (12 pages).

International Search Report and Written Opinion dated Oct. 28, 2016 issued in international patent application No. PCT/US2016/045233 (10 pages).

International Search Report and Written Opinion dated Dec. 9, 2016 in international patent application No. PCT/US2016/046509 (13 pages).

International Search Report and Written Opinion dated Dec. 19, 2016 in international patent application No. PCT/US16/50393 (11 pages).

International Search Report and Written Opinion dated Jan. 23, 2017 in international patent application No. PCT/US2016/049245 (16 pages).

International Search Report and Written Opinion dated Jan. 19, 2017 in international patent application No. PCT/US2016/058407 (16 pages).

International Search Report and Written Opinion dated Jan. 25, 2017 in international patent application No. PCT/US2016/058383 (13 pages).

GridSense, "Maximize Intelligence and Minimize Costs at the Distribution Level," http://www.gridsense.com/solutions-products/transformer-monitoring/distribution-transformer-monitoring/, accessed Oct. 13, 2015, 3 pages.

(56) References Cited

OTHER PUBLICATIONS

Balakrishnan et al., "Models for Planning Capacity Expansion in Local Access Telecommunication Networks," Massachusetts Institute of Technology Sloan School Working Paper #3048-89-MS, Aug. 1989, 88 pages.
Corte-Real et al., "Network flow models for the local access network expansion problem," Computers & Operations Research vol. 34, 2007, pp. 1141-1157.
Bauer, "Bundling, Differentiation, Alliances and Mergers: Convergence Strategies in U.S. Communication Markets," Communications & Strategies, No. 60, Dec. 2005, online at http://mpra.ub.uni-muenchen.de/2515/, pp. 59-93.
Balakrishnan et al., "Models for Planning the Evolution of Local Telecommunication Networks," Massachusetts Institute of Technology Operations Research Center working paper, OR195-89, May 1989, 80 pages.
"Smart meter," http://en.wikipedia,org/wiki/Smart_meter, Nov. 10, 2009, 4 pages.
Smart Grid Northwest, "Qualitrol," http://smartgridnw.org/membership/member-organizations/qualitrol/, accessed Oct. 13, 2015, 3 pages.
International Search Report dated May 26, 2017 in counterpart international patent application No. PCT/US2017/019434 (10 pages).
Güngör, V. et al., "Smart Grid Technologies: Communication Technologies and Standards," IEEE Transactions on Industrial Informatics, vol. 7, No. 4, Nov. 2011, pp. 529-539.
Güngör, V. et al., "A Survey on Communication Networks for Electric System Automation," Feb. 2006, available at: https://smartech.gatech.edu/bitstream/handle/1853/27879/electric_system_automation.pdf.
Zaballos, A. et al., "Heterogeneous Communication Architecture for the Smart Grid," IEEE Network, vol. 25, No. 5, Sep./Oct. 2011, pp. 30-37, available at: http://www.itk.ntnu.no/fag/TTK4545/TTK2/Pensum-filer/SmartGrid.pdf.
Clark, A. et al., "Wireless Networks for the Smart Energy Grid: Application Aware Networks," Proceedings of the International MultiConference of Engineers and Computer Scientists, vol. 2, Mar. 17-19, 2010, available at: http://www.iaeng.org/publication/IMECS2010/IMECS2010_pp1243-1248.pdf.
Parikh, P. et al., "Opportunities and Challenges of Wireless Communication Technologies for Smart Grid Applications," 2010, available at: http://citeseerx.ist.psu.edu/viewdoc/download?doi=10.1.1.453.7100&rep=rep1&type=pdf.
U.S. Appl. No. 16/372,911, filed Apr. 2, 2019, "Data Transfer Facilitation to and Across a Distributed Mesh Network Using a Hybrid TV White Space, Wi-Fi and Advanced Metering Infrastructure Construct" (43 pages).
Hafeez et al., "Smart Home Area Networks Protocols within the Smart Grid Context", Sep. 2014, Journal of Communications, vol. 9, No. 9, pp. 665-671.
Spinsante et al., "NFC-Based User Interface for Smart Environments", Feb. 24, 2015, Hindawi Publishing Corporation, Advances in Human-Computer Interaction, vol. 15, pp. 1-12.
Modoff et al., "Industry the Internet of Things", May 6, 2014, Deutsche Bank Markets Research, (102 pages).
Tuohy, Jennifer, "What is home automation and how do I get started", Jan. 26, 2015, Network World, (9 pages).
Snyder, A.F., et al., "The ANSI C12 protocol suite—updated and now with network capabilities", Mar. 2007 (available at http://horizontec.com/sccsmartgrid.2yt4/2007-03ClemsonPSC02-snyder-mtgstuber.pdf) (6 pages).
Parag Kulkarni, et al., "A Mesh-Radio-Based Solution for Smart Metering Networks", IEEE Communications Magazine, Jul. 2012, 10 pages.
Metz, Cade, "Facebook's Massive New Antennas Can Beam Internet for Miles," https://www.wired.com/2016/04/facebooks-massive-new-antennas-can-beam-internet-miles/, Apr. 13, 2016.
Choubey, Neeraj, et al., "Introducing Facebook's new terrestrial connectivity systems—Terragraph and Project ARIES—Facembook Engineering," https://engineering.fb.com/connectivity/introducing-facebook-s-new-terrestrial-connectivity-systems-terragraph-and-project-aries/, Apr. 13, 2016.

* cited by examiner

DISTRIBUTED 802.11S MESH NETWORK USING TRANSFORMER MODULE HARDWARE FOR THE CAPTURE AND TRANSMISSION OF DATA

CROSS REFERENCE TO RELATED APPLICATION

This application claims benefit to U.S. Provisional Application No. 62/299,348 filed 24 Feb. 2016, which is hereby incorporated by reference in their entirety.

The present invention forms part of, and builds on, the family of technologies disclosed in the other related applications identified below.

BACKGROUND OF THE INVENTION

1. Field of the Invention

The present invention relates to a distributed 802.11s wireless wide area mesh network including transformer monitoring devices, smart meters and other associated wireless elements for the capture and transmission of data.

2. Brief Description of Related Art

Proliferation of the "Internet of Things" (IoT) is driving interconnected smart systems. In particular, smart grids are following this trend though the establishment of smart energy, gas and water management. Interconnected components are now providing an unprecedented level of intelligence supporting numerous operational actions. This landscape is ushering in vast amounts of unstructured data and the need for intelligent data parsing, analysis and action systems.

With this IoT understanding and backdrop, currently there is a need within global smart grid networks, e.g., in urban and remote locations with limited electric infrastructure, for communications with transformers, residential and commercial meters and other Internet/wireless connected IoT devices. These targeted locations do not have sufficient infrastructure to fully deploy a smart grid or Internet infrastructure.

There is a need within global smart grid networks, in urban and remote locations with limited electric infrastructure, for communications with transformers, residential and commercial meters and other Internet/wireless connected devices {commonly referred to as the "Internet of Things"}. These targeted locations do not have sufficient infrastructure to fully deploy a smart grid or Internet infrastructure.

Other AMI (Advanced Metering Infrastructure) vendors have brought mesh communications to the marketplace for years, typically using 900 MHz frequency radios to perform this function. These other technologies historically suffer from both poor throughput and latency, offering nothing more beyond meter reading. Further complicating this situation, prior business cases for these networks were predicated upon the assumption that higher order Smart Grid features would be deployable in these networks, a proposition which failed in practice. Examples of these prior assumptions were Fast Response Demand Response, Consumer Engagement Style Energy Efficiency, Frequency Response, etc.

By replacing the slow and crippled radio frequency (RF) implementations of other vendors with a Wi-Fi based mesh network, the present invention is able to provide high throughput and low latency communications from the hardware and network. This enhanced capability enables the unfulfilled promise of AMI rollouts and opens the door to large scale data collection and interactive applications not available through any of todays' AMI solutions.

More services will be enabled over time, taking advantage of real-time data streaming. The first roll-out is fraud detection and enhanced AMI functionality, but others such as renewable balancing; fine grained outage detection and demand response, to name a few, will follow.

In addition to these utility focused solutions, we will in-time bring broadband to areas where investments in rollout have not yet occurred. By standardizing on a series of Wi-Fi bubbles (that form our mesh), we may optionally open up portions of the bandwidth to other uses for any Wi-Fi connectable device, depending upon the deployed AMI configuration and the local back-haul availability (methodology and capability of the infrastructure connecting the deployed AMI system with the backend connectivity solution) at the targeted locations.

Delta's solution enhances our utility partner's enterprise operations through the synergistic implementation of the smart grid network and balance sheet refinancing model (recognizing that the balance sheet refinancing model may not be necessary in all cases, customers and installations) while deploying a unique, alternative network for BtB/BtC data receipt and delivery.

SUMMARY OF THE INVENTION

The smart grid network of the present invention provides the inclusion of wireless mesh communications and data transmission capability into transformer monitoring modules, transformer monitoring being a core component of the smart grid network. These transformer modules may include the capability to both collect and transmit information from the transformer, residential and commercial meters and other Internet/wireless connected devices. These devices differ from other existing technologies by incorporating a transceiver, transmitter and antenna collectively within the same device to both collect data from other network devices deployed in the field and communicate data back to a central location or other connected devices, using a wireless wide area mesh network topology.

In general, mesh networking is a network topology in which a device transmits its own data as well as serves as a relay for other devices' data. The mesh network connects the transformer monitor devices, smart meters and other sensors or IoT devices wirelessly to each other and to a central point in the mesh cell called a "collector" to transmit data to the cloud using the 802.11s standard in combination with other available back-haul technologies; telecommunications, Ethernet, fiber optic and satellite, to name a few. The devices in the mesh network may also comprise optical-based communications technology, for transmitting and receiving optical signals containing data and information.

The collector is a circuitry-board based technology that passes data between multiple smart meters, transformer monitoring devices and a server-based collection engine. The collector functions as a router, exchanging messages between a cloud based software collection engine and meters using a radio-frequency wireless wide area network in combination with other available back-haul technologies; telecommunications, Ethernet, fiber optic and satellite, to name a few. Communications between the collector and the collection engine is done using a Wireless Wide Area Network (WWAN), deployed in a mesh network topology, which can include a variety of back-haul technologies, as noted above. All network communications meet ANSI C12 Meter Communication and Data standards and requirements. The transformer monitoring device may comprise the collector.

The mesh network is dynamic and is continuously being rebuilt using wireless communication between smart meters, transformer monitoring devices and collectors. Connectivity between a meter or transformer monitoring devices, and a collector can be direct, through another smart device or through multiple layers of smart devices. Smart devices will automatically register through the collector that provides the best connectivity signal and path to the collection engine. A smart device must register before communications with the collection engine can begin. Each collector can support multiple devices over a self-healing mesh network. If the path between a device and a collector is broken or blocked, the device will locate another path, healing the mesh network, through the network mesh to the collector.

The segregation of near or overlapping mesh networks is secured through the use of a utility identification (ID). Only devices with the same utility ID can communicate across a mesh network. This ensures that a device with one utility ID is isolated from a network assigned a different utility ID. The use of the utility ID protocol allows neighboring utilities to use the smart grid network system, yet be securely isolated from the other utility's network.

The collector used by each device to communicate with the collection engine can change over time. For example, if the communication path between a collector and device deteriorates, the device will explore other paths to the same or different collector. If a better communication path is found, the device will deregister from the original collector and register with the collector that provides the best communication path. Connectivity testing, registering and deregistering are built-in capabilities and are done automatically.

The data from a device may pass through other devices in the mesh network before it reaches the cell relay. The 802.11s mesh network is built using the 5 GHz radio signal frequency band, 2 GHz radio signal frequency band or other methodologies such as optical-based communications technology. The mesh network is not limited to any specific RF, Optical, wired or wireless structure.

The mesh network also may include a hub at both the residence and business. The hub would perform the following functions: (1) Be located in proximity to the smart meter installed at the residence or business; (2) Whereas the smart meter may be located on the outside of the residence or business, the hub would be located inside the residence or business; (3) the hub would communicate with the smart meter either wirelessly using the 802.11s mesh network or via hard wiring; (4) the hub would then broadcast a corresponding 802.11 specification based RF signal (a, b, g, n, ac, ad, ah, aj, ax, ay, az or others that may follow) internally to the structure in which it is place; (5) Other products and/or commercially available wireless 802.11 products would communicate with the hub and expand its range, either point to point or through a similar wireless mesh network structure; (6) Further other Wi-Fi enabled digital products would communicate with the hub, either directly or through the expanded wireless mesh network referenced above.

The nodes in the mesh network are arranged in a variable array and relay data bi-directionally. The nodes cooperate in the distribution of data. Traditionally, there are no defined roles in the mesh, such as clients, servers, initiators and responders. Security is typically provided by peer-to-peer protocols, traditionally through MAC Address authentication and a pre-shared key, WPA2 password in many cases. Within the wireless wide area network (WWAN) standard strong level encryption protocols, to name a few, are used. The mesh array may be with fixed points/static topologies or mobile. Many consider a wireless mesh as an ad-hoc network, noting the multiple and potentially changing pathways.

In operation, the wireless mesh will relay messages, also known as data packets, using a variety of methodologies; flooding and routing being two such methods. Hopping is a most commonly used form or routing. Messages or data packets hop across nodes to other nodes, and, this hopping can change, based upon the scenarios explained below. Hopping transfers messages/data packets from a source to a destination(s). The hopping pathway is not fixed and can change or dynamically reconfigure. Self-healing algorithms drive path optimization, including changes in the data hopping, data flooding or overall data routes; routing around unreliable nodes, routing around in-active nodes, routing around over-loaded notes, identification of shortest paths, for example to name a few. In most cases, the initial construct of the wireless mesh network, when first powered up, is self-constructing, e.g. it does not necessarily need to be pre-defined. However, in many cases, there is a logic behind the location of nodes within the network. In the initial wireless mesh construct, those building the network may perform an "RF survey." The RF Survey reviews the local characteristics of the installation area (hills, valleys, buildings, landscaping, etc.) and determines the best locations for nodes to maximize their ability to transfer data unimpeded. However, this initial construct does not limit the final execution of the wireless mesh when operational.

The present invention provides several advantages over the prior art. Legacy wireless mesh technology has a high latency and low bandwidth. Existing direct broadcast networks have low bandwidth, expensive radio and spectrum problems. In both cases, this results in a lack of smart grid application support and lack of return on investment. Cellular networks carry the downside power requirements, and radio, data and device certification costs. The wireless mesh network of the present invention addresses these shortcomings by providing a network that is self-healing, can be built out incrementally, has multiple communication paths, reduces RF spectrum issues and provides real time optimization, low latency, high bandwidth and a history of backward compatibility to consumer, commercial and industrial devices. This results in full support for fast demand response, energy efficiency, real time analysis and expanded product interaction and functionality. The wireless mesh network of the present invention provides a lower cost due to its wireless structure, the ad-hoc nature and non-reliance on a fixed and/or physical pathway and the incorporation of commonly available RF equipment, chipsets and consumer/commercially available products.

According to some embodiments, the present invention may include, or take the form of, a power grid network featuring a mesh network having a mesh node with a signal processor configured to:

receive signaling containing information about collected data, including electrical signaling data related to electrical signaling being processed by a transformer to which the mesh node is coupled, metered data related to associated electrical signaling being provided from the transformer to a building or structure, and other mesh network data from one or more other mesh nodes deployed in the mesh network; and determine corresponding signaling containing information about the collected data for transmitting back to a central location or one or more corresponding mesh nodes in the mesh network for further processing, based upon the signaling received.

The power grid network according to the present invention may also include one or more of the following features:

The signal processor may be configured to provide the corresponding signaling to the central location or the one or more other corresponding mesh nodes for further processing.

The mesh node may include a collector chip set, mesh/cellular chip set and/or optical-based communications technology.

The collector chip set may be configured to receive the signaling containing information about the collected data, including the electrical signaling data related to the electrical signaling being processed by the transformer to which the mesh node is coupled, the metered data related to the associated electrical signaling being provided from the transformer to the building or structure, and the other mesh network data from the one or more other mesh nodes deployed in the mesh network.

The mesh/cellular chip set may be configured to provide the corresponding signaling, including to either a cellular head-end, commonly noted as the back-haul and inclusive of other transmissions agents in addition to cellular, or the one or more other corresponding mesh nodes in the mesh network.

The mesh network may include another mesh node having a mesh/cellular chip set configured to receive the corresponding signaling from the mesh node, and provide the corresponding signaling to either a cellular head-end, commonly noted as the back-haul and inclusive of other transmissions agents in addition to cellular, or another mesh node in the mesh network.

The mesh network may include, or take the form of, an 802.11s mesh network.

The mesh node may include a transformer monitor, communication and data collection device having a combination of a transceiver, transmitter and an antenna/optical network configured to receive the signaling at the transformer located and arranged in the power grid network and provide the corresponding signaling back to the central location or the one or more other corresponding mesh nodes.

The transformer monitor, communication and data collection device may include a housing with a magnet or bolt attachment for attaching the housing to a corresponding housing of the transformer.

The building or structure may be a residential building or commercial structure.

The metered data may be received from an electric meter associated with the building or structure, including where the meter data is received from a gas meter, or a water meter, or some combination of meters.

The metered data may be received either from a single phase residential electric meter associated with a residential building, or either from a three-phase commercial electric meter associated with a commercial structure.

The signaling may contain associated information about the distribution of the electrical signaling in the power grid network.

The associated information may include distribution information about a power outage, the voltage of the electrical signaling, and/or transformer monitoring, including voltage analysis, DRM or energy theft.

The signaling and the corresponding signaling may be, or take the form of, wireless signaling for communicating in the mesh network.

The signaling received may contain information about digital content requested by one or more smart assets locally deployed in a smart asset infrastructure and communicatively coupled to the mesh network.

The corresponding signaling determined may contain information about the digital content requested by the one or more smart assets for providing back to the central location in the mesh network for further processing, based upon the signaling received.

The signal processor may be configured to receive associated signaling containing information about the digital content requested back from the central location; and determine digital content signaling containing information about the digital content requested for providing to the one or more smart assets, based upon the associated signaling received.

The signal processor may be configured to provide the digital content signaling to the one or more smart assets.

The smart asset infrastructure may include a residential home or commercial structure; and the one or more smart assets include a smart asset mesh node, including where the smart asset mesh node takes the form of a residential home or commercial structure automation device, a smart communications device, and/or a digital set-top box arranged in relation to the residential home or commercial structure.

The digital content may include movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

The digital content may also contain information about applications and/or processes related to industry, energy, transportation, healthcare, consumer products, social media, entertainment, transportation, banking, on-line commerce, industrial automation, or gaming.

The mesh node may include, or form part of, an unmanned aerial vehicle or drone.

The mesh node may be configured to communicate with a cloud network by exchanging cloud node signaling.

The cloud network may include the central location.

The central location may include a server that forms part of an Internet service provider network.

The mesh network may include a network topology in which each mesh node is configured to transmit the collected data and serve as a relay to transmit corresponding collected data received from corresponding mesh nodes in the mesh network.

The mesh network may include transformer monitor, communication and data collection devices, smart meters and other sensors or IoT devices that are connected wirelessly to each other and to a central point in a mesh cell or collector node to transmit data to a cloud network using the IEEE 802.11s standard.

The mesh node may include a circuitry-board based technology that passes or exchanges data between the transformer monitor, communication and data collection devices, the smart meters and the other sensors or IoT devices and the mesh cell or collector node.

The mesh cell or collector node may be configured as a router for exchanging messages between a software collection engine and the smart meters using a radio-frequency local area network.

The communications between the mesh cell or collector node and the software collection engine may be done using a Wireless Wide Area Network (WWAN), deployed in a mesh network topology, that includes various back-haul technologies.

The mesh node may be configured to register through the mesh cell or collector node that provides a connectivity signal and path to the software collection engine.

Each mesh cell or collector node may be configured to support multiple mesh nodes over a self-healing mesh network.

The mesh node may be configured to locate another path through the mesh network to the mesh cell or collector node if a path between the mesh node and the mesh cell or collector node is broken or blocked.

Each mesh node in the mesh network may be configured to receive a utility ID in order to provide the mesh network with security.

Each mesh node may be configured to communicate across a part of the mesh network having the same utility ID to ensure that a mesh node with one utility ID is isolated from a network part of the mesh network assigned a different utility ID.

Each mesh node may be configured to explore other paths to the same or a different mesh cell or collector node if a communication path between a given mesh cell or collector node and a given mesh node deteriorates.

Each mesh node may be configured to deregister from an original mesh cell or collector node and register with a new mesh cell or collector node that provides a best communication path.

Each mesh node may be configured to implement built-in capabilities functionality for connectivity testing, registering, deregistering/re-registering that are done automatically.

DETAILED DESCRIPTION OF THE INVENTION

The overall smart power grid network according to the present invention represents an interconnected so-called "BIG DATA" technology system providing advanced intelligence and synergistic components across power metering, distribution and communication, optimization and installation and servicing. The network incorporates discrete elements in the transformer monitoring and communications, residential and commercial metering and analytical, predictive and pre-emptive software algorithms. The hardware associated with the network facilitates communications with transformers, residential and commercial meters, and other Internet/wireless connected devices (commonly referred to as the "Internet of Things" (IoT)). The network's geographically disbursed assets support a wireless mesh network communications extension, while aiding system optimization capabilities, noting that many assets are in logistically difficult areas to reference, re-locate, interrogate and service. The overall integrated system drives substantial efficiencies in data visualization, evaluation, diagnosis, optimization, and servicing using enhanced reality systems across this interconnected smart grid network and similar networks. The collective systems provide a synergistic and unique alternative network for BtB/BtC data receipt, delivery and monetization.

Figure 1:
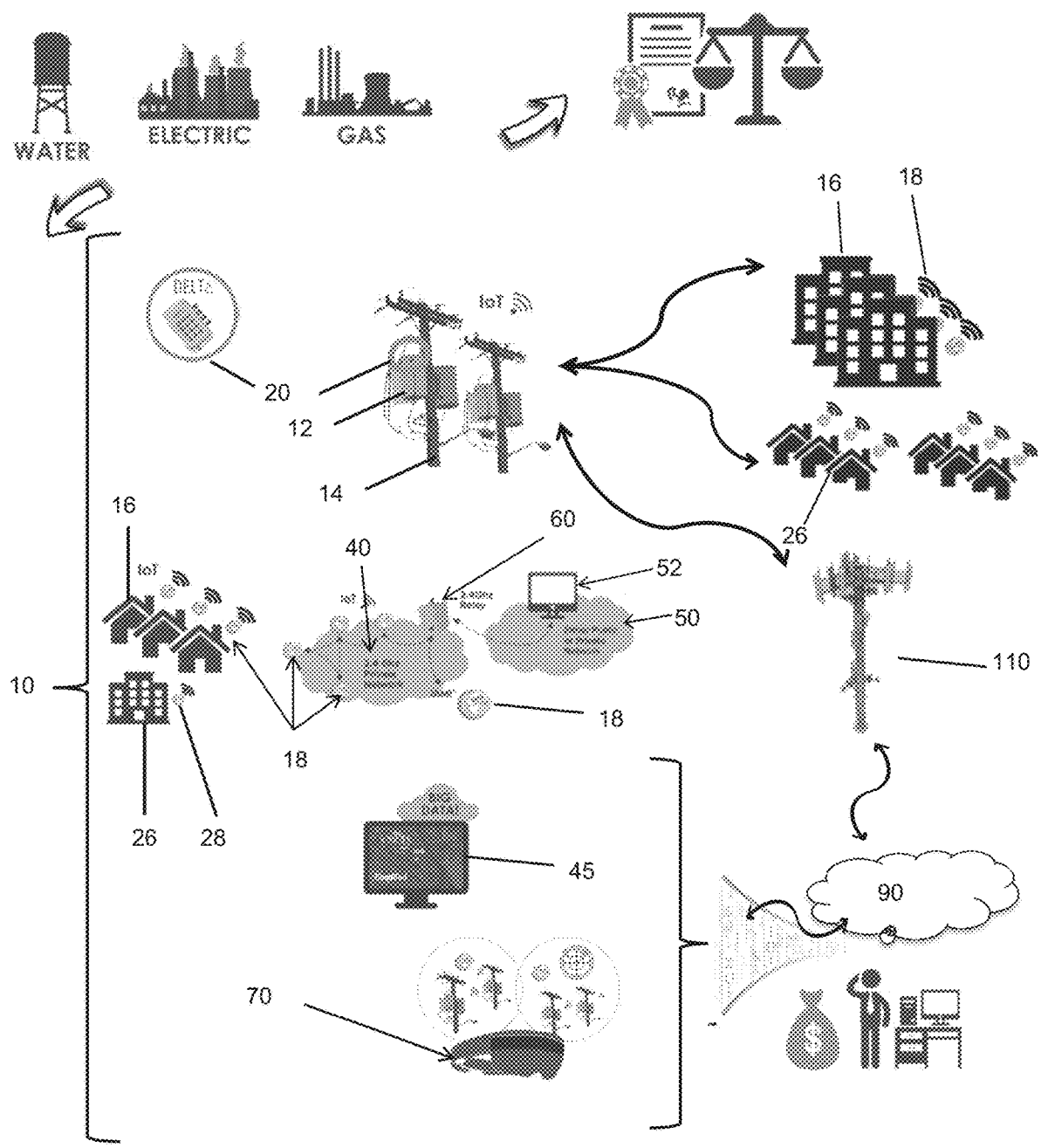
FIG. 1 is a diagram showing an establishment of a baseline, power grid centric, smart utility mesh network, according to some embodiments of the present invention.

An example of an implementation of a smart grid network 10 is shown in FIG. 1. The smart grid network 10 according to the present invention represents a singular, standardized, and scalable network, providing the industry's first inclusive solution from a singular supplier. The smart grid network 10 may incorporate a utility financials rebalancing, and incorporate utility customers and IoT adjacencies. The smart grid network 10 is inclusive of four basic technology elements. The primary hardware and software constituents of the network are as noted and identified below.

1. The pole or pad mounted transformer monitor/smart data collector device is identified herein as element 20, according to the present invention (AKA "HyperSprout™"), which is the localized data aggregation and power flow investigation; establishing a data capture and delivery capability wherever there is power, e.g., consistent with that set forth herein.

2. A digital data and delivery and receipt mesh network (AKA "DataVINE™") is identified herein as element 40, which is a ubiquitous mesh network facilitating automated residential and commercial metering while deploying an alternative data delivery capability; enforcing a market-leading 100% meter read capability, e.g., consistent with that set forth in U.S. application Ser. No. 15/250,119 (WFMB No. 756-2.6-2).

3. A smart node power grid communication protocol and analytics platform (AKA "DataSCAPE™"), identified herein as element 45, which provides for a comprehensive nodal exchange analysis of all grid parameters; realizing an inclusive geo-spatial understanding of utility operations, e.g., consistent with that set forth in U.S. provisional application Ser. No. 62/375,170 (WFMB No. 756-2.4-2).

4. A head-mounted user device 70 for enhanced reality field investigation, interaction and servicing; deploying the industry's first "virtual" utility (AKA "PowerVISR™"), e.g., consistent with that set forth in U.S. patent application Ser. No. 15/234,293 (WFMB No. 756-2.3-2).

The smart grid network 10 and the mesh network 40 enabled by the transformer monitor device 20 and other network devices provide network access to an end user. Additionally, the end user may use the established network for the purpose of storing and retrieving data and files from a cloud-based server 90.

By way of example, FIG. 1 shows an example of a smart power grid network generally indicated as 10, according to some embodiments of the present invention. The smart power grid network 10 may take the form of, or may be configured to include, one or more digital data and delivery and receipt mesh networks like element 40. Each digital data and delivery and receipt mesh network 40 may include one or more communication nodes such as the transformer module or device 20 for exchanging information upstream and downstream between the communication nodes and a central location, e.g., which takes the form of the private network 50 in FIG. 1. The one or more communication nodes may be configured to be able exchange such upstream and downstream information between themselves in order to exchange such upstream and downstream information between a respective communication node and the central location like element 50.

In FIG. 1, the smart power grid network 10 may include transformers like element 12 for providing electric energy to residential homes and commercial buildings like elements 16, 26, each having a respective electrical meter like elements 18, 28 for measuring the associated electrical energy usage. The smart power grid network 10 may also include transformer monitor/data collection devices 20 configured to collect data about the electrical energy usage in relation to residential homes and commercial buildings 16, 26 from the respective electrical meter like element 18, 28. For example, each electrical meter 18, 28 may provide metered data signaling containing information about metered data related to associated electrical signaling being supplied from the transformer 12 to the building or structure 16, 26 in the grid network 10. Moreover, transformer monitor/data collection devices 20 may receive associated signaling containing information about electrical signaling data related to electricity being processed by the transformer 12 located and arranged in the grid network and to which the transformer monitoring device is mounted, as well as other wireless network data related to other communication nodes forming part of other wireless network devices deployed in the grid network. In effect, the collected data received by the transformer monitor device 20 may include some combination of the electrical signaling data related to the transformer, the metered data related to the electrical meter and/or the other wireless network data related to other communication nodes in the grid network, e.g., which may include digital content as set forth in further detail below.

The transformer monitor/data collection devices 20 may also be configured to provide suitable signaling containing information about the collected data to the private network 50 via the digital data and delivery and receipt mesh network 40. The private network 50 may be configured as a central point that processes the collected data, e.g., performing utility analysis that may include one or more of the following: delivery subtraction analysis, proactive asset monitoring, distribution asset utilization, T and D subtraction analysis, energy audits and analysis, load control, geographic localization and define pro-active and pre-emptive asset efficiency or operational activities. By way of example, the utility analysis may be performed in an effort to increase efficiency, decrease costs, increase profits and/or community engagement related to the operation of the smart grid network 10.

The pole 14 mounted transformer monitoring device 20 may be configured in communication with the electrical meter 18 associated with the residential home 16. By way of example, the electrical meter 18 may be configured to measure single phase electrical energy provided by the transformer 12 along a single phase utility line to the residential home 16.

In comparison, the pole 14 mounted transformer monitoring device 20 may also include, or take the form of, a pad mounted transformer device in communications with an electrical meter associated with a commercial building or home. By way of example, the electrical meter may be configured to measure three phase electrical energy provided by a pad transformer along a three phase utility line to the commercial building or home.

FIG. 1 shows that the transformer monitoring device 20 may be configured to collect data related to some distribution related functionality, e.g., including determinations related to outage, momentary outage, voltage/VAR, and/or transformer monitoring. The transformer monitor device 20 may be configured to collect data related to some voltage analysis, DRM functionality and energy theft functionality in relation to its associated residential home or commercial building. The transformer monitor device 20 can provide the suitable signaling containing information about the collected data to the private network 50 via the digital data and delivery and receipt mesh network 40. The collected data received by the private network 50 may also be analyzed in relation to conservation, load curtailment and/or a demand response vis-a-vis the power utility. In FIG. 1, the private network 50 may include a private network computer and monitor generally indicated as 52 for performing or implementing the aforementioned analysis and functionality.

FIG. 1 shows that the digital data and delivery and receipt mesh network 40 may include other transformer monitor devices like element 20 exchanging information with other meters like elements 18, 28 associated with other buildings or structures like elements 16, 26. FIG. 1 also shows a relay 60 coupled between the digital data and delivery and receipt mesh network 40 and the private network 50.

The present invention represents a new and unique inclusion of wireless communications and data transmission capability into transformer monitoring modules like element 20, transformer monitoring being a core component within a so-called smart grid network like element 10. These transformer modules 20 may be mounted directly to utility transformers 12 or utility poles 14 in the field and include the capability to both collect and transmit information from the transformer 12, residential and commercial meters like element 18 and other Internet/wireless connected devices in the network 10. The transformer module or device 20 according to the present invention differs from other existing technology by incorporating a transceiver, transmitter and antenna collectively within the same device to both collect data from other network devices, including other transformer modules 20 or smart assets, deployed in the field and communicate collected data back to a central location like element 50 or other connected devices like other elements 20 whilst building a Wireless Wide Area Network (WWAN), deployed in a mesh network topology.

The aforementioned overall combination provides an infinitely scalable data delivery and receipt capability for communities with poorly established, historical infrastructure while providing a synergistic network capability to those communities with current or anticipated cellular, satellite, optical or other capability.

Once established, the smart grid network implementation and the associated transformer module and mesh network hardware and software assets may be easily expanded to allow for integration with both smart city infrastructure 16, 26 and home automation smart devices. For example, inclusion of a smart grid network communications chip set for implementing smart grid network communications chip set signal processing functionality into locally deployed smart assets allows for both the capture and communications of digital information both to and from these smart asset devices. By way of example, these smart asset devices may include, or take the form of, set top boxes having the smart grid network communications chip set contained therein, e.g., for communicating with a transformer module like element 20, or for communication with the so-called cloud-based server 90. In areas of established infrastructure, this capability allows for the localized capture and communications with smart devices within the geographical confines of the mesh network smart network like element 10. In areas where coordination is required outside of this localized network, a back-end cellular capability may be utilized, like the back-end cellular functionality associated with a back-end cellular tower like element 110. In pen-urban and rural areas of extremely poor infrastructure and cellular service, the smart grid network deployed system provides a competitive and less costly alternative to dedicated cellular infrastructure and may be paired with various wireless transmissions medias including cellular, satellite, optical or other wireless transmissions media either now known or later developed in the future.

The mesh network 40 described herein is an open network, such that those within the geographic region of operation will opt-in if desired, through the utility company, telecommunications partner or local ISP partner administering the network. The network is not closed to any individuals opting in, provided they have been authenticated using the appropriate security protocols. The network is configured to support a throughput of up to 600 Mbps, as noted in the appropriate IEEE specification, and as realized in a 802.11s wireless mesh network topology.

By way of further example, the integration with, or replacement of, local wireless network delivery systems allows the seamless integration with current home automation technology, allowing for the direct communication with these devices using the smart grid network deployed system.

Scaling of the deployed transformer modules or devices 20 with ongoing optimization of the defined mesh network 40 allows for establishing a lucrative alternative pathway for digital content receipt and delivery to networked consumers. Recognizing the proliferation of digital set-top boxes like elements from the leading consumer technology innovators, inclusion of the smart grid network chip set within these devices provides an alternative capability for digital content beyond that currently offered by cellular and broadband suppliers. The digital content may include movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

Figure 2:
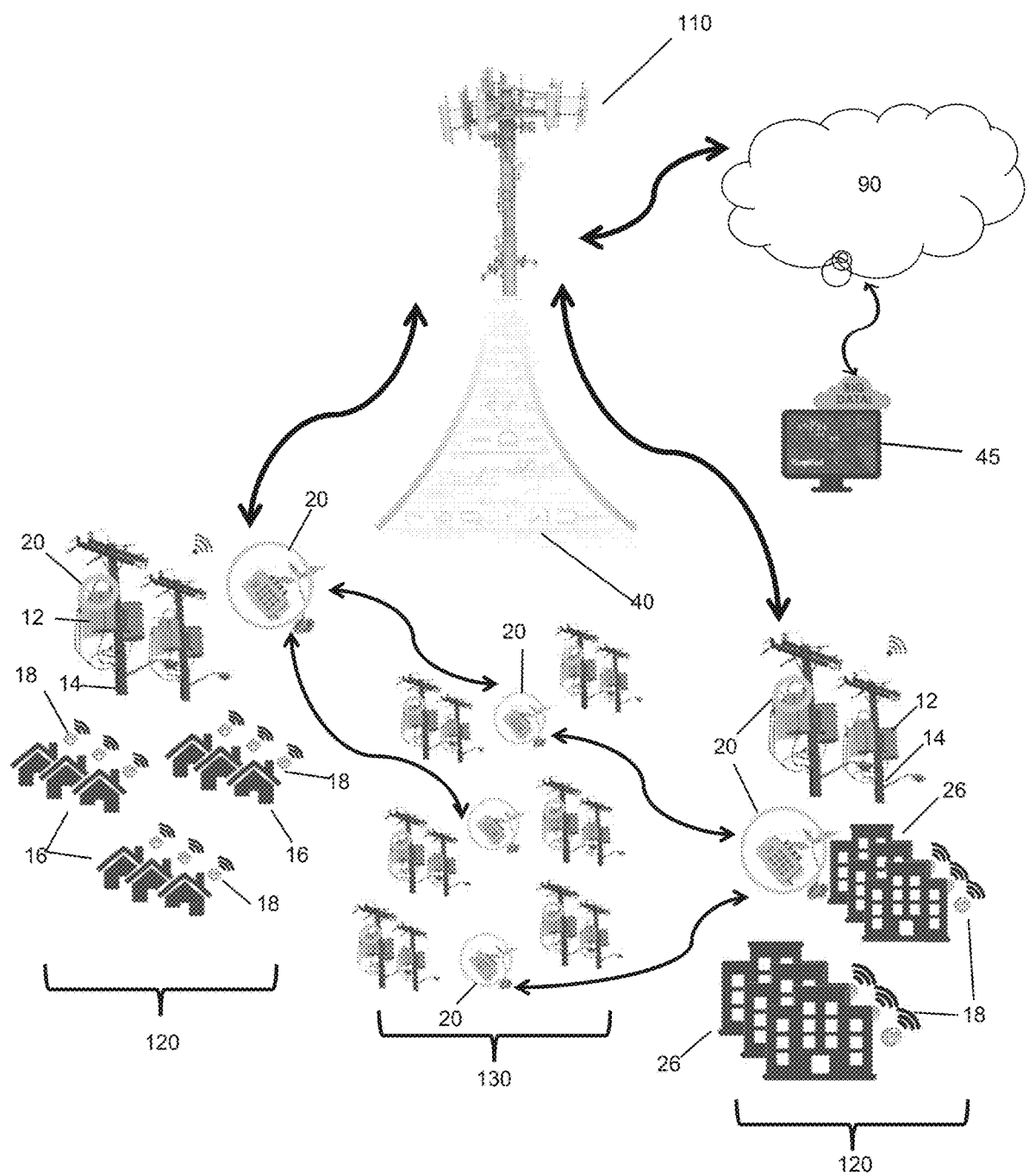
FIG. 2 is a diagram of a mesh network comprising two versions of the transformer monitoring device hardware in accordance with an embodiment of the present invention.

FIG. 2 shows an example of a mesh network with two versions of the transformer monitoring device 20.

The first version 120 includes both a collector chip set and a mesh/cellular chip set. It communicates with the head-end (e.g., cellular tower 110), while pulling transformer data, mart meter data and transformer data the devices of the second version 130 and other mesh network data.

The second version 130 includes only the mesh/cellular chip set. It communicates with the devices of the first version 120 while pulling data.

Data flow in the smart grid mesh network may be as follows. Data collected at a smart meter 18, 28 is transmitted through the wireless wide area mesh network to a transformer monitor/data collection device 20. The data is transmitted then to a head-end, such as cellular tower 110, from which is transmitted to the cloud-based server 90. The data can then be analyzed using a smart node power grid communication protocol and analytics platform 45. Metered data may also be collected from gas meters, water meters, or any other type of resource measurement meter, and transmitted to a transformer monitor/data collection device 20 for transmission through the wireless mesh network 40.

Figure 3:
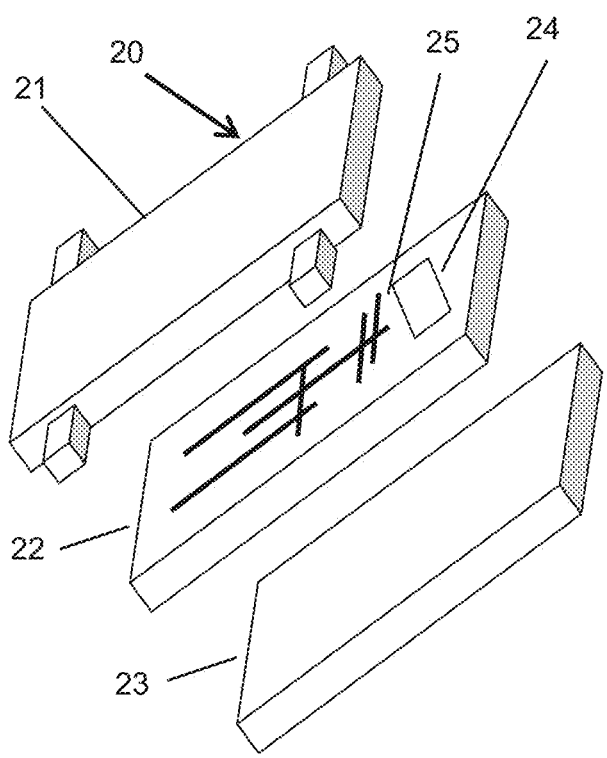
FIG. 3 is a diagram of a transformer monitoring device in accordance with a first embodiment of the present invention.

FIG. 3 shows an example embodiment of a transformer monitor/data collection device 20, having, for example, an upper housing 21, internal circuitry 22 and a lower housing base 23.

By way of example, the internal circuitry 22 may be configured inclusive of transmission, reception, networking, data aggregation and sensor input, among other requirements for implementing signal processing functionality in relation to the same. For example, any signal processing functionality may be implemented using a signal processor like element 24, consistent with that set forth herein and described in further detail below.

In particular, the internal circuitry 22 may be configured to implement transmission/reception signal processing functionality, e.g., for exchanging suitable transmission/reception signaling to/from other communication nodes in the smart grid network, or to/from the central location or other connection device like element 50 for further processing, including in relation to some combination of either a cloud network, or a digital data and delivery and receipt mesh network 40, or by using a smart node power grid communication protocol, consistent with that set forth herein.

Further, the internal circuitry 22 may also be configured to implement networking and data aggregation signal processing functionality, e.g., for exchanging suitable networking and data aggregation signaling received to/from other communication nodes in the smart grid mesh network, or to/from the central location or other connection device for further processing, including in relation to some combination of either the cloud network, or the digital data and delivery and receipt mesh network, or by using the smart node power grid communication protocol.

Furthermore, the internal circuitry 22 may also be configured to implement sensor input signal processing functionality, e.g., for exchanging suitable sensor input signaling containing information about sensed input information received by the transformer monitor/data collection device 20 to/from the electric meter 18, 28 of the residential home or commercial building, or to/from the transformer itself. Furthermore still, the scope of the invention is not intended to be limited to any particular type or kind of signal processing functionality that may be implemented by the internal circuitry 22; embodiments are envisioned, and the scope of the invention is intended to include, implementing other types or kind of signal processing functionality by the internal circuitry 22 either now known or later developed in the future within the spirit of the present invention.

The upper housing 21 or housing base 23 may be attached to a pole, pad, transformer, unmanned aerial vehicle or another structure by being configured for magnetic attachment, a strap, bolt attachment, or other methodologies. The scope of the invention is not intended to be limited to the type or kind of attachment; and embodiments are envisioned using, and the scope of the invention is intended to include, other types or kinds of attachment techniques either now known or later developed in the future within the spirit of the present invention.

The upper housing 21 and the lower housing base 23 may be combined together to form an assembled housing having the internal circuitry 22 therein. By way of example, the assembled housing may be hermetically sealed against the ingress of environmental elements, e.g., like water, dust, particles, moisture, etc. All interconnect ports may be sealed. The assembled housing may be configured to provide protection for reducing electromagnetic interference (EMI), e.g., from the transformer itself or other EMI emitting devices within range. The assembled housing may also be configured for easy transport, attachment, detachment and decommissioning, e.g., in relation to a utility pole or some other structure.

The transformer monitor/data collection device 20 may include an antenna/optical network 25 built into the internal circuitry 22, or alternatively incorporated directly into either housing 21 or 23, or alternatively located external to the housing assembly. Techniques for implementing a built-in antenna/optical network like element 25 into internal circuitry like element 22, for incorporating an antenna/optical network directly into a housing like elements 21 or 23, or for locating an external antenna/optical network to a housing assembly are known in the art, and the scope of the invention is not intended to be limited to any particular type or kind thereof either now known or later developed in the future.

In the transformer monitor/data collection device 20, a battery may be provided for device power. Alternatively, the transformer monitor/data collection device 20 may also have an accommodation for wireless power transfer via inductance or tuned magnetic resonance. These data and power functionalities are provided by way of example; and the scope of the invention is not intended to be limited to the type or kind of data or power functionality implementation; and embodiments are envisioned using, and the scope of the invention is intended to include, other types or kinds of data or power functionality implementation either now known or later developed in the future within the spirit of the present invention.

The transformer monitor device 20 may further comprise a memory or non-transitory computer readable medium. The memory may be configured to store information that is received or transmitted by the transformer monitor device 20. Further, the memory may be stored with appropriate programming, which when executed by the signal processor 24 of the transformer monitor device 20, is configured to enable the transformer monitor device 20 to transmit and receive signaling, as would be understood by persons having ordinary skill in the art.

The device may also be configured for light-based communications, including but not limited to visible light, infrared light, laser technology, LED technology and various light-based communications schemes such as VLC or Li-Fi. Light controlling optics may be built into the internal circuitry, incorporated directly into the upper housing or housing base, or may be located externally to the housing. The device may comprise one or more external light receptors and transmitters, which are configured to receive and transmit optical signals. The transmitter may include, for example a beam generator, which is configured to generate a light beam comprising signaling containing information, which is for example transmitted from a device to a further device, which receives the signal via receptor and processes the signal using the signal processor. The device may be configured to use one or more light-based communication technologies, and may be configured to vary between types of communication depending on the particular usage. For example, for a long range communication between two devices, laser technology may be most suitable. However, for a short range communication between two devices, Li-Fi may be the most suitable method of communication. The transformer monitor device may further comprise a memory or non-transitory computer readable medium. The memory may be configured to store information that is received or transmitted by the light-based communication of the transformer monitor device. Further, the memory may be stored with appropriate programming, which when executed by the signal processor of the transformer monitor device, is configured to enable the transformer monitor device to transmit and receive light-based communications, as would be understood by persons having ordinary skill in the art.

The transformer monitor device may enable the establishment of a hybrid network within the smart grid network 10, which may include at least three different types of communication capabilities. First, the devices may be configured to create an optical network, as previously described. In an optical network, devices, as well as other devices in a smart grid network 10, such as electric meters 18 and IoT devices, having optical transmission and receiving capabilities may communicate with one another. Such an optical network allows for communication of signals and data at a high bandwidth and range. Additionally, the device may be further configured for cellular communication. The device is configured to send and receive signaling to and from a cellular tower and from cellular devices in the smart grid network 10. Furthermore, the device may be configured to create a wireless or Wi-Fi network, which can be used for communication with or between electric meters 18 and IoT devices, which in certain instances may not be configured for optical or light-based communication. The creation of a Wi-Fi network by the device or a series of devices enables communication between such legacy devices.

Figure 4:
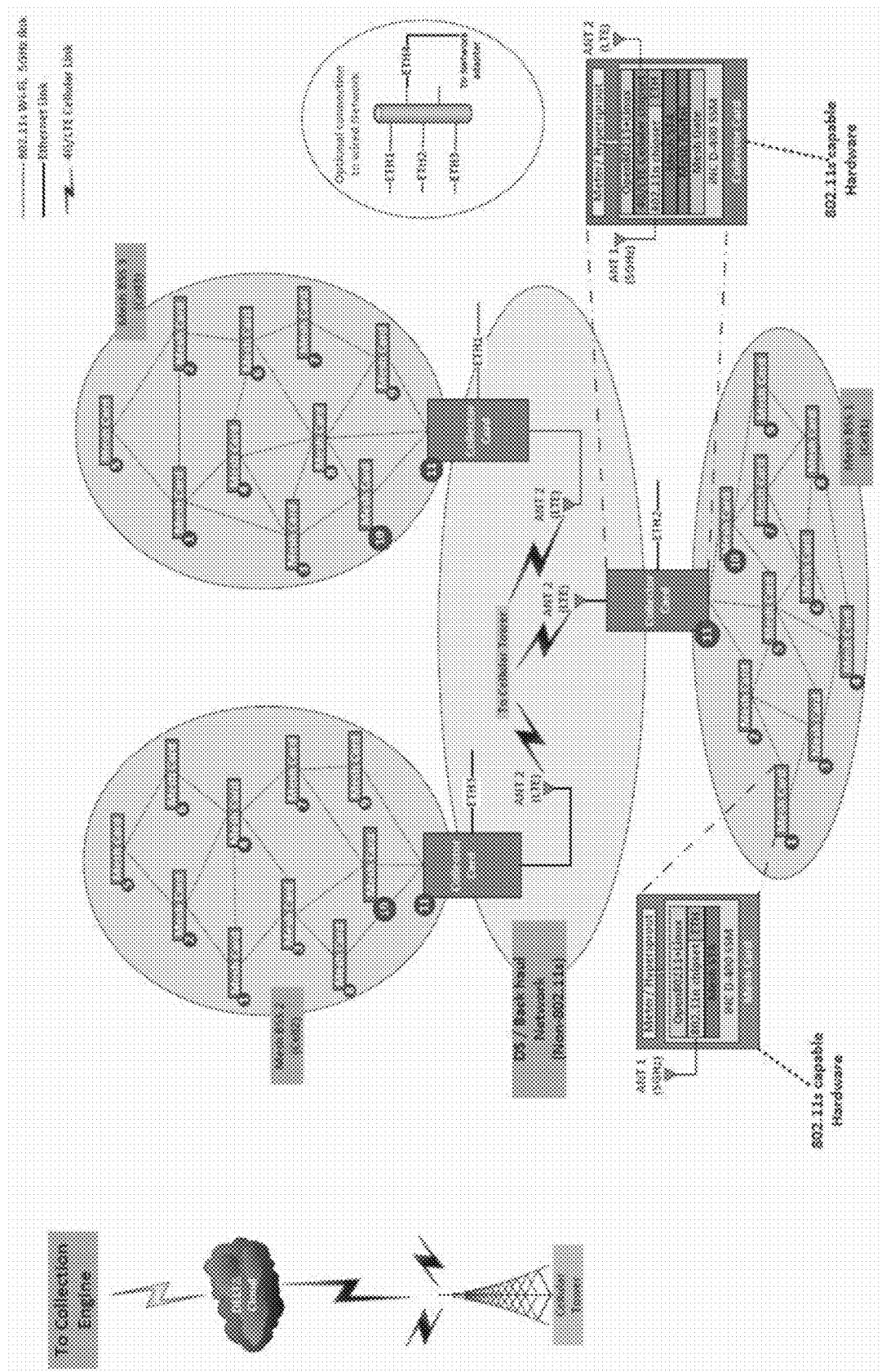
FIG. 4 is a diagram of an exemplary system architecture of the mesh network in accordance with an embodiment of the invention.

Exemplary mesh network architecture of the system is shown in FIG. 4. With reference to FIG. 4, system architecture includes the below components in the mesh network:

TABLE 1

| Terminology in 802.11s | Application terminology | Description |
| --- | --- | --- |
| Mesh Station (Mesh STA) | Mesh Card, Collector card | A quality-of-service (QoS) STA that implements the mesh facility. They participate in the formation of mesh basic service set |
| Mesh Gate | Collector card | Any entity that has mesh station (STA) functionality and provides access to one or more distribution systems, via the wireless medium (WM) for the mesh basic service set (MBSS). |
| Mesh Portal (MPP) | Collector card | The portal is a function. It is the logical point where wireless MSDUs (MAC service data units) are translated to and from a non-802.11 network. |
| Mesh Access Point (MAP) | Mesh Card, Collector card | Any entity that has station (STA) functionality and provides access to the distribution services, via the wireless medium (WM) for associated STAs. |
| Mesh BSS (MBSS) | Cell | A basic service set (BSS) that forms a self-contained network of mesh stations (STAs). An MBSS contains zero or more mesh gates |
| Distribution system (DS) | Back-haul network | A system used to interconnect and transport MSDU's between mesh gates in the same or different MBSSs, between mesh gates and AP's, between mesh gate and portals |

802.11s amendment defines the concept of a mesh station (5.2.14.3). A Mesh station is a station that supports the mesh facility and is capable of participating in a mesh cloud, or Mesh Basic Service Set (MBSS).

As shown in FIG. 4, a mesh card (Mesh STA) is integrated part of smart meter or transformer monitoring device. A number of mesh cards (Mesh STA) with 802.11s mesh capability forms a mesh network. Each mesh card (Mesh STA) can communicate to its neighboring mesh card (Mesh STA) in mesh network.

In the embodiment shown in FIG. 4, Mesh BSS 1(Cell1) has formed a mesh network of 1-10 nodes of mesh cards (Mesh STAs) for the mesh network of the present invention.

The distribution system (DS) is a logical component that handles address to destination mapping. It "distributes" frames from one interface to another. This could be distribution of a frame from a client on the 2.4 GHz radio to a client on the 5 GHz radio; it could be from a client on the 2.4 GHz radio to the wired network; or it could be from a client on the 2.4 GHz radio to an MBSS on the 5 GHz radio. In any case, the DS is a logical construct and not necessarily a separate medium, like the Ethernet.

For the mesh network of the present invention, the distribution system may include a back-haul network of 4G/LTE, the wired network of Ethernet, fiber optic network, satellite communications, or other back-haul methodologies. Back-haul methodologies noted are not meant to imply or represent limitations as to back-haul capabilities. Collector cards interconnect mesh network (all mesh nodes) with the collection engine through a 4G/LTE back-haul network. Communication between two collector cards is also possible through 5 GHz Wi-Fi, 2.4 GHz Wi-Fi, or 4G/LTE, to name a few. Node 11 in Mesh BSS1 (Cells 1), Mesh BSS2 (Cells 2) and Mesh BSS3 (Cells 3) are collector cards. These collector cards are playing multiple roles in a network, including: (1) A mesh station (Mesh STA) because it participates in the MBSS; (2) A mesh gate because it translates between the MBSS and DS; and (3) A mesh portal because it connects MBSS to a non-802.11 DS (4G/LTE or Ethernet).

When the translation occurs between a mesh BSS and a non-mesh 802.11 DS, this function is called mesh gate. The mesh gate is the logical point where mesh MSDUs are translated to and from a non-mesh 802.11 DS and format.

All nodes have frame forwarding capability and can thus forward frames originating at a node and destined for some other node. From a hardware standpoint, there will be two versions of PCBA's (Mesh card and Collector Card) as depicted in FIG. 4.

Figure 5:
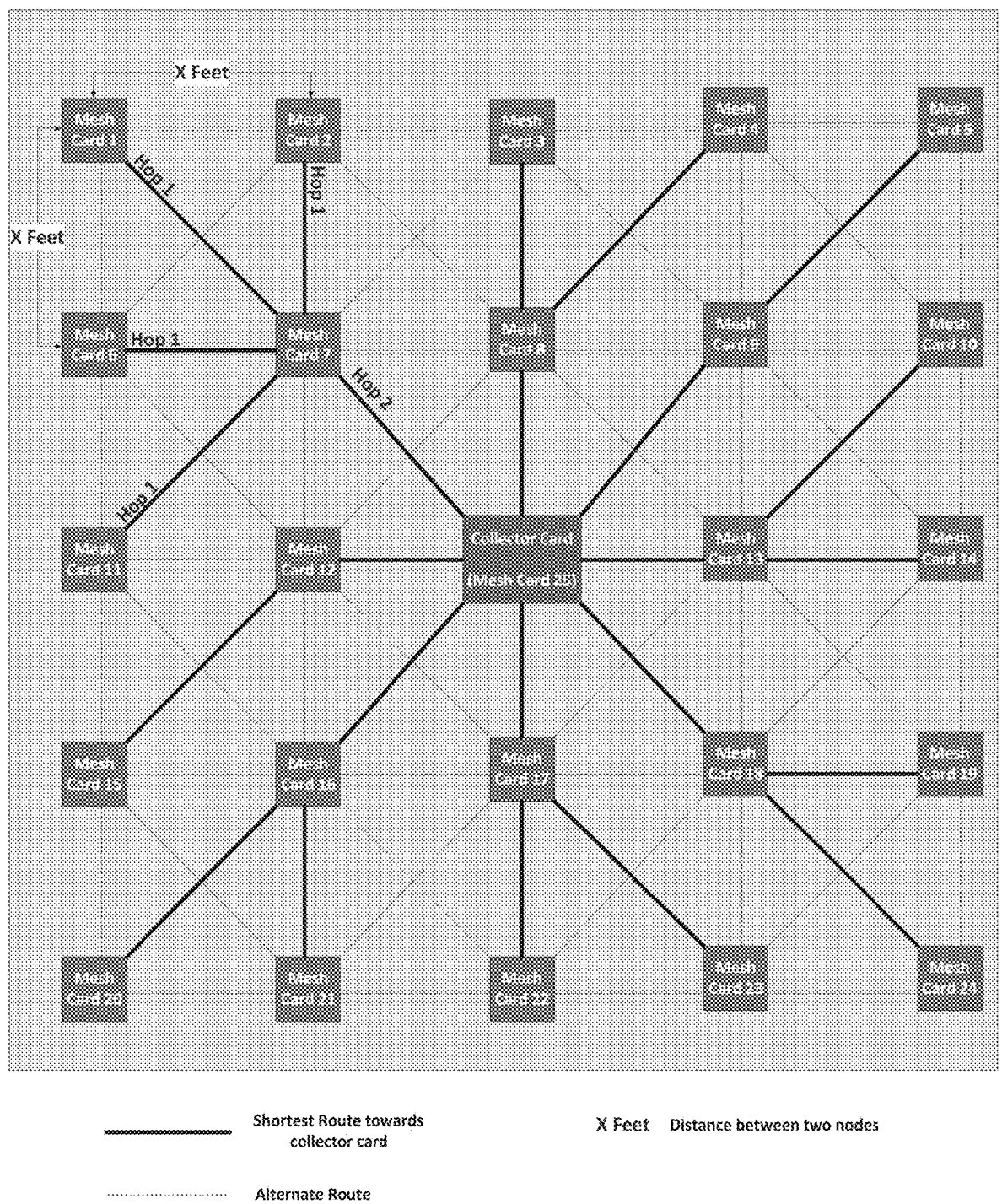
FIG. 5 is a diagram of an exemplary deployment of the mesh network in accordance with an embodiment of the invention, including mesh cards and collector cards.

FIG. 5 shows an example of an ideal mesh network deployment of mesh cards and collector cards.

In the ideal case, the collector card will be placed at center of network (Mesh BSS). All mesh cards (Mesh STAs) are placed around the collector card at a distance of X feet in terms of the line of sight of each other, which in some embodiments may be a minimum 1000 feet)

In the example embodiment of the invention shown in FIG. 5, the nodes are deployed such that the data from last node in network will reach collector card in a maximum two hops. In FIG. 5, Mesh card 1 will route the data to collector card (Mesh card 25) via mesh card 7 with two hops. The note representations are not meant to imply or represent limitations as to routing/hopping capabilities, and in alternative embodiments, more than two hops may be deployed between nodes.

Smart Mesh Networks are also self-healing. If any node fails, the system recognizes the failure and automatically re-routes data over another available "best" or fastest path. The alternate paths are shown by dotted lines in FIG. 5. If any node fails in the network, the system will automatically recognize the alternate path for that node.

Other Related Applications

The application is related to other patent applications, some of which are identified above, that together form part of the overall family of technologies developed by one or more of the inventors herein, and disclosed in the following applications:

U.S. patent application Ser. No. 15/160,754, filed 20 May 2016, entitled "Transformer mounted monitor, communications and data collection device," which claims benefit to U.S. provisional application No. 62/203,101 (WFMB No. 756-2.2-1), filed 10 Aug. 2015;

U.S. patent application Ser. No. 15/234,293, filed 11 Aug. 2016, entitled "Enhanced reality system for visualizing, evaluating, diagnosing, optimizing and servicing smart grids and incorporated components," which claims benefit to U.S. provisional application Ser. No. 62/203,719 (WFMB No. 756-2.3-1), filed 11 Aug. 2015;

U.S. provisional application Ser. No. 62/375,170 (WFMB No. 756-2.4-2), filed 15 Aug. 2016, entitled "Integrated solution of Internet of Things, DSGN™ and iDAP™ pertaining to Communication, Data and Asset Serialization";

U.S. application Ser. No. 15/257,302 (WFMB No. 756-2.5-2) filed 6 Sep. 2016, entitled "System and Method for Determination and Remediation of Energy Diversion in a Smart Grid Network", which claims the benefit of U.S. provisional application Ser. No. 62/213,815 (WFMB No. 756-2.5-1), filed 3 Sep. 2015;

U.S. application Ser. No. 15/250,119 (WFMB No. 756-2.6-2) filed 29 Aug. 2016, entitled "Supplemental And Alternative Digital Data Delivery and Receipt Mesh Network Realized Through the Placement of Enhanced Transformer Mounted Monitoring Devices", which claims the benefit of U.S. provisional application Ser. No. 62/236,420 filed 2 Oct. 2015;

U.S. application Ser. No. 15/332,245 (WFMB No. 756-2.7-2) filed 24 Oct. 2016, entitled "Augmentation, Expansion and Self-Healing of a Geographically Distributed Mesh Network Using Unmanned Aerial Vehicle Technology", which claims the benefit of U.S. provisional application Ser. Nos. 62/244,914 and 62/244,919 filed 22 Oct. 2015 and U.S. provisional application Ser. No. 62/299,348, filed 24 Feb. 2016; and U.S. application Ser. No. 15/332,151 (WFMB No. 756-2.8-2) filed 24 Oct. 2016, entitled "Data Transfer Facilitation Across a Distributed Mesh Network Using Light and Optical Based Technology", which claims the benefit of U.S. provisional application Ser. No. 62/244,919 (WFMB No. 756-2.8-1), filed 22 Oct. 2015;

which are all assigned to the assignee of the instant patent application, and which are all incorporated by reference in their entirety.

It should be understood that, unless stated otherwise herein, any of the features, characteristics, alternatives or modifications described regarding a particular embodiment herein may also be applied, used, or incorporated with any other embodiment described herein. Also, the drawing herein may not be drawn to scale in whole or in part. Although the invention has been described and illustrated with respect to exemplary embodiments thereof, the foregoing and various other additions and omissions may be made therein and thereto without departing from the spirit and scope of the present invention.

What is claimed:

1. A power grid network comprising:
   a mesh network having a mesh node with a signal processor configured to:
   receive signaling containing information about collected data, including electrical signaling data related to electrical signaling being processed by a transformer to which the mesh node is coupled, metered data related to associated electrical signaling being provided from the transformer to a building or structure, and other mesh network data from one or more other mesh nodes deployed in the mesh network; and determine corresponding signaling containing information about the collected data for transmitting back to a central location or one or more corresponding mesh nodes in the mesh network for further processing, based upon the signaling received;

wherein the mesh node is a transformer monitoring device configured to serve as a mesh access point to the mesh network, and comprises:

a collector chip set configured to receive at least the signaling containing information about the metered data related to the associated electrical signaling being provided from the transformer to the building or structure, and the other mesh network data from the one or more other mesh nodes deployed in the mesh network; and a mesh/cellular chip set configured to transmit the corresponding signaling.

2. A power grid network according to claim 1, wherein the mesh/cellular chip set is configured to provide the corresponding signaling to the central location or the one or more other corresponding mesh nodes for further processing.

3. A power grid network according to claim 1, wherein the one or more other mesh nodes deployed in the mesh network comprise one or more meters each comprising a mesh/cellular chip set; and wherein the transformer monitoring device is configured to receive the metered data from the one or more meters in the mesh network.

4. A power grid network according to claim 3, wherein the mesh network is a wireless communication network incorporating a backhaul.

5. A power grid network according to claim 4, wherein the wireless communication network is an open, closed or mixed network configured to provide network access to end user devices authenticated by a network administrator.

6. A power grid network according to claim 5, wherein the wireless communication network is a Wi-Fi mesh network.

7. A power grid network according to claim 1, wherein the mesh network comprises another mesh node having a mesh/cellular chip set configured to receive the corresponding signaling from the mesh node, and provide the corresponding signaling to either a cellular head-end or another mesh node in the mesh network.

8. A power grid network according to claim 1, wherein the mesh network includes, or takes the form of, an 802.11s wireless mesh network.

9. A power grid network according to claim 1, wherein the transformer monitoring device further comprises a combination of a transceiver, transmitter and an antenna/optical network configured to receive the signaling at the transformer located and arranged in the power grid network and provide the corresponding signaling back to the central location or the one or more other corresponding mesh nodes.

10. A power grid network according to claim 9, wherein the transformer monitoring device comprises a housing with a magnet or bolt attachment for attaching the housing to a corresponding housing of the transformer.

11. A power grid network according to claim 1, wherein the metered data is received from an electric meter associated with the building or structure, including where the meter data is received from a gas meter, or a water meter, or some combination of meters.

12. A power grid network according to claim 1, wherein the signaling contains associated information about the distribution of the electrical signaling in the power grid network.

13. A power grid network according to claim 12, wherein the associated information includes distribution information about a power outage, the voltage of the electrical signaling, and/or transformer monitoring, including voltage analysis, DRM or energy theft.

14. A power grid network according to claim 12, wherein the signaling and the corresponding signaling are wireless signaling for communicating in the mesh network.

15. A power grid network according to claim 1, wherein the signaling received contains information about digital content requested by one or more smart assets locally deployed in a smart asset infrastructure and communicatively coupled to the mesh network;

the corresponding signaling determined contains information about the digital content requested by the one or more smart assets for providing back to the central location in the mesh network for further processing, based upon the signaling received.

16. A power grid network according to claim 15, wherein the signal processor is configured to receive associated signaling containing information about the digital content requested back from the central location; and determine digital content signaling containing information about the digital content requested for providing to the one or more smart assets, based upon the associated signaling received.

17. A power grid network according to claim 16, wherein the signal processor is configured to provide the digital content signaling to the one or more smart assets.

18. A power grid network according to claim 15, wherein the smart asset infrastructure includes a residential home or commercial structure; and the one or more smart assets include a smart asset mesh node, including where the smart asset mesh node takes the form of a residential home or commercial structure automation device, a smart communications device, and/or a digital set-top box arranged in relation to the residential home or commercial structure.

19. A power grid network according to claim 15, wherein the digital content includes movies, songs, photographs, advertising media, social media exchanges, internet searching requests, internet searching downloads, digital imagery, web page renderings, streaming media, on-line gaming, voice over internet, video over internet, email communications, business analytics, consumer analytics, industrial automation including SCADA activities, home automation, governmental and emergency related broadcasts, digital business model facilitation, including on-line commerce.

20. A power grid network according to claim 15, wherein the digital content contains information about applications and/or processes related to industry, energy, transportation, healthcare, consumer products, social media, entertainment, transportation, banking, on-line commerce, industrial automation, or gaming.

21. A power grid network according to claim 1, wherein the mesh node is configured to communicate with a cloud network by exchanging cloud node signaling.

22. A power grid network according to claim 21, wherein the cloud network comprises the central location.

23. A power grid network according to claim 22, wherein the central location includes a server that forms part of an Internet service provider network or location.

24. A power grid network according to claim 1, wherein the mesh network comprises a network topology in which each mesh node is configured to transmit the collected data and serve as a relay to transmit corresponding collect data received from corresponding mesh nodes in the mesh network.

25. A power grid network according to claim 1, wherein the mesh network comprises transformer monitoring devices, smart meters and other sensors or IoT devices that are connected wirelessly to each other and to a central point in a mesh cell or collector node to transmit data to a cloud network using the IEEE 802.11s standard.

26. A power grid network according to claim 25, wherein the mesh node comprises a circuitry-board based technology that passes or exchanges data between the transformer monitoring devices, the smart meters and the other sensors or IoT devices and the mesh cell or collector node.

27. A power grid network according to claim 26, wherein the mesh cell or collector node is configured as a router for exchanging messages between a software collection engine and the smart meters using a radio-frequency wireless wide area network (WWAN), deployed in a mesh network topology.

28. A power grid network according to claim 27, wherein the mesh node is configured to register through the mesh cell or collector node that provides a connectivity signal and path to the software collection engine.

29. A power grid network according to claim 28, wherein each mesh node is configured to explore other paths to the same or a different mesh cell or collector node if a communication path between a given mesh cell or collector node and a given mesh node deteriorates.

30. A power grid network according to claim 29, wherein each mesh node is configured to deregister from an original mesh cell or collector node and register with a new mesh cell or collector node that provides a best communication path.

31. A power grid network according to claim 30, wherein each mesh node is configured to implement built-in capabilities functionality for connectivity testing, registering, deregistering/re-registering that are done automatically.

32. A power grid network according to claim 27, wherein each mesh cell or collector node is configured to support multiple mesh nodes over a self-healing mesh network.

33. A power grid network according to claim 32, wherein the mesh node is configured to locate another path through the mesh network to the mesh cell or collector node if a path between the mesh node and the mesh cell or collector node is broken or blocked.

34. A power grid network according to claim 32, wherein each mesh node in the mesh network is configured to receive a utility ID in order to provide the mesh network with security.

35. A power grid network according to claim 34, wherein each mesh node is configured to communicate across a part of the mesh network having the same utility ID to ensure that a mesh node with one utility ID is isolated from a network part of the mesh network assigned a different utility ID.

36. A power grid network according to claim 26, wherein communications between the mesh cell or collector node and the software collection engine is done using a Wireless Wide Area Network (WWAN) that includes back-haul technologies.

* * * * *